(12) United States Patent
Sellergren

(10) Patent No.: US 6,676,159 B1
(45) Date of Patent: Jan. 13, 2004

(54) FUEL-STORING DEVICE

(76) Inventor: Per-Ivar Sellergren, Hjuviks Bryggväg 7 B, SE-423 40 Torslanda (SE)

( * ) Notice: Subject to any disclaimer, the term of this patent is extended or adjusted under 35 U.S.C. 154(b) by 0 days.

(21) Appl. No.: 09/689,166

(22) Filed: Oct. 12, 2000

(30) Foreign Application Priority Data

Oct. 12, 1999 (SE) .............................................. 9903651

(51) Int. Cl.[7] .............................................. B62D 21/16
(52) U.S. Cl. .................... 280/783; 206/0.7; 220/562; 220/586; 420/900
(58) Field of Search ............................... 280/782, 783, 280/831; 206/0.7; 220/581, 586, 562, 62.17; 95/900, 901, 903, 116; 423/645, 658.2; 420/900

(56) References Cited

U.S. PATENT DOCUMENTS

| | | | | |
|---|---|---|---|---|
| 40,458 A | * | 11/1863 | Clark | 280/831 |
| 1,177,007 A | * | 3/1916 | Auerbacher | 296/37.13 |
| 1,264,094 A | * | 4/1918 | Laisne | 280/783 |
| 1,343,682 A | | 6/1920 | Richmond | |
| 3,869,012 A | * | 3/1975 | Schubach | 280/831 |
| 3,994,778 A | * | 11/1976 | Grover et al. | 376/418 |
| 4,211,537 A | * | 7/1980 | Teitel | 206/0.7 |
| 4,964,524 A | * | 10/1990 | Halene | 206/0.7 |
| 5,370,418 A | * | 12/1994 | Pugh | 280/830 |
| 5,443,578 A | * | 8/1995 | Davis, Jr. | 280/834 |
| 5,445,099 A | * | 8/1995 | Rendina | 114/140 |
| 5,499,279 A | * | 3/1996 | Chakraborty | 376/301 |
| 5,653,951 A | | 8/1997 | Rodriguez et al. | |
| 5,673,939 A | * | 10/1997 | Bees et al. | 280/831 |
| 5,890,740 A | * | 4/1999 | Kami | 280/831 |
| 5,906,792 A | * | 5/1999 | Schulz et al. | 148/420 |
| 6,080,501 A | * | 6/2000 | Kelley et al. | 429/31 |
| 6,290,753 B1 | * | 9/2001 | Maeland et al. | 206/0.7 |
| 6,293,590 B1 | * | 9/2001 | Ogasa | 280/831 |
| 6,294,142 B1 | * | 9/2001 | Nazri | 423/275 |

FOREIGN PATENT DOCUMENTS

| | | | |
|---|---|---|---|
| DE | 737775 | | 6/1943 |
| DE | 1254490 | | 11/1967 |
| DE | 4243455 A1 | * | 6/1994 |
| DE | 004322717 A1 | * | 1/1995 |
| DE | 19708404 | | 10/1997 |
| EP | 0187011 A1 | * | 7/1986 |
| EP | 0 348 383 A2 | * | 12/1989 |
| GB | 1209918 | | 5/1968 |
| JP | 404297377 A | * | 10/1992 |
| JP | 09002323 A | * | 1/1997 |
| SE | 444802 | | 5/1986 |
| SE | 463020 | | 10/1990 |

* cited by examiner

*Primary Examiner*—Paul N. Dickson
*Assistant Examiner*—Ruth Ilan
(74) *Attorney, Agent, or Firm*—Howrey Simon Arnold & White LLP

(57) ABSTRACT

A device for storing fuel in an engine-powered transport vehicle including at least one closed construction element which is incorporated as an integral part of the body or chassis structure of the transport vehicle. The closed construction element is arranged as a storage unit for the fuel. As a result of the invention, an improved fuel storage unit is provided for, in particular, hydrogen-gas-powered motor vehicles.

7 Claims, 2 Drawing Sheets

FUEL-STORING DEVICE

TECHNICAL FIELD

The present invention relates to a fuel-storing device in an engine-powered transporter. The invention is intended to be used for storing gaseous fuels for transport means, expediently in the form of motor vehicles such as, for example, passenger cars.

BACKGROUND OF THE INVENTION

In connection with engine-powered transport means, for example cars, airplanes and rockets, there is a general requirement for safe, effective and economical storage of engine fuel.

As far as combustion-engine-powered vehicles are concerned, for example in the form of passenger cars, it has in recent years become increasingly desirable to use engines which are powered with alternative types of fuel compared with those used in currently conventional petrol- and diesel-powered engines. As examples, engines can be cited which are powered by natural gas, alcohol-based fuels (methanol or ethanol) and/or hydrogen gas. The reasons for the adoption of new fuels are at least partly based on the fact that the earth's reserves of fossil fuels are thought to be limited and also because of growing public opinion and increasingly stringent legislation that favors environmentally friendly engine fuels and vehicles.

In this context, it has been established that hydrogen gas can be used as fuel for engine-powered vehicles and that an engine system of this kind then represents a suitable alternative to conventional petrol-powered or diesel-powered combustion engines. The reason why hydrogen gas is attractive as such an alternative fuel includes that it can be produced using, for example, solar energy. Moreover, hydrogen gas burns without carbon dioxide ($CO_2$) being generated, a further advantage, since generation of carbon dioxide, for example through burning of fossil fuels, is thought to contribute to the so-called greenhouse effect.

Where hydrogen is used as fuel in connection with motor vehicles, however, there are certain problems. Included among these problems is the difficulty associated with achieving a storage system on board a vehicle which works in practice. According to known systems, various types of hydrogen containers are used in vehicles which store the hydrogen either in gaseous form, in liquid form, bound in metal hydrides or absorbed in carbon.

Where hydrogen is stored in gaseous form, a very high storage pressure is required; more precisely, pressures of the order of magnitude of 300 bar. This causes a relatively high weight and cubic capacity being required for such storage tanks. Moreover, such a system can constitute a safety risk in connection with, for example, passenger cars.

When hydrogen is stored in liquid form, a very low temperature is required for maintained storage. This calls for costly cooling systems, which is a disadvantage. An advantage of storing hydrogen in liquid form is, however, that the vehicle in question acquires a relatively long range of travel.

When hydrogen is stored in a metal hydride system; that is, in one in which the hydrogen molecules are bound in a metal hydride structure and are released upon heating, a storage system is also required which is relatively heavy. In addition, devices are required for heating the metal hydride structure to enable the hydrogen's liberation.

When hydrogen absorbed in carbon is stored, a very low storage temperature is required for the hydrogen to enable it to be bound to the carbon. According to what has been stated above, this is a disadvantage.

It can further be established that previously known systems which are based on hydrogen-powered fuel cells lead to difficulties in connection with tubings; that is, connections to, and distribution within the fuel cells. These difficulties are hard to solve regarding leakage, flow, collision and safety aspects. Moreover, previously known hydrogen gas containers have been space-consuming, expensive, temperature-sensitive, heavy and/or difficult to place in the transporting vehicle.

In U.S. Pat. No. 5,653,961, a system is described for storing hydrogen gas in so-called nanostructures; that is, microstructures which are constructed as a matrix of graphite laminae having dimensions which are tailored to the acceptance of hydrogen molecules. Nanostructures of this kind can be used to store a large quantity of hydrogen gas per unit of volume compared with previously known storage systems. This means that a fuel-cell-powered vehicle having a hydrogen gas tank which has a cubic capacity of, for example, 40 liters and comprises nanostructures, can acquire a travel range of just over 12,800 km.

By virtue of German Document DE 19708404, a vehicle chassis having a special fuel-storage space accommodated in the lower section of the chassis is known. More precisely, this fuel storage space is constituted by a defined space adjoining the floor of the vehicle. In the fuel-storage space, a number of different types of energy carriers can be arranged and used; the energy carriers being installed in this case from the side of the vehicle. In this document, a hydrogen gas container is cited as a conceivable energy-storage method. The arrangement is set up as an exchangeable system; i.e., a fuel-storage system which is configured such that its various fuel containers can easily be reached and individually exchanged, instead of being filled at regular intervals.

In the light of the above, it can be seen that there is a need for storage systems for hydrogen which are cost-effective, economical, safe, lightweight, easy to handle and more compact then previously known storage systems.

SUMMARY OF THE INVENTION

The present invention in its several disclosed embodiments alleviates the drawbacks described above with respect to conventionally designed devices for storing engine fuel and incorporates several additional beneficial features.

An object of the present invention is to provide a device for storing engine fuel, more particularly hydrogen, in vehicles in which the above-mentioned problems may effectively be solved. This is achieved by means of a device, the distinguishing features of which are described in greater detail hereinbelow.

The invention constitutes a device for storing fuel in an engine-powered transport vehicle or means having at least one closed construction element which is incorporated as an integral part of the body or chassis structure of the transport means. The invention is characterized in that the closed construction element, moreover, is arranged as a storage unit for the fuel.

As a result of the invention, a number of advantages are attained. First and foremost, it can be noted that the invention facilitates safe and effective storage of hydrogen gas in a transport means. According to a preferred embodiment, existing structures in the transport means are configured with a nanostructure, for example nanofibers of carbon, which facilitates storing hydrogen gas with a high-pack efficiency. This allows, in turn, a high range of travel for the transport means.

Preferably, use is made of a nanostructure that is integrated within a chassis structure belonging to the transport means or within some other exterior or interior construction element, for example panels, doors, hatches or a floor structure of the transport means.

The invention further allows hydrogen gas to be stored more safely and economically than is the case with known systems. The fact that the invention utilizes existing structures in a transport means or vehicle signifies that weight increases are minimized which would otherwise follow if a separate tank were used for the fuel.

According to a preferred embodiment, a barrier layer of metal hydride is used in the above-mentioned construction element. In this way, a totally leak-proof storage of the fuel in question is provided.

The beneficial effects described above apply generally to the exemplary devices, mechanisms and methods disclosed herein for the storage of fuel in a carrying vehicle. The specific structures and steps through which these benefits are delivered will be described in greater detail hereinbelow.

BRIEF DESCRIPTION OF THE DRAWINGS

The invention will now be described in greater detail in the following way, by example only, and with reference to the attached drawings, in which.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
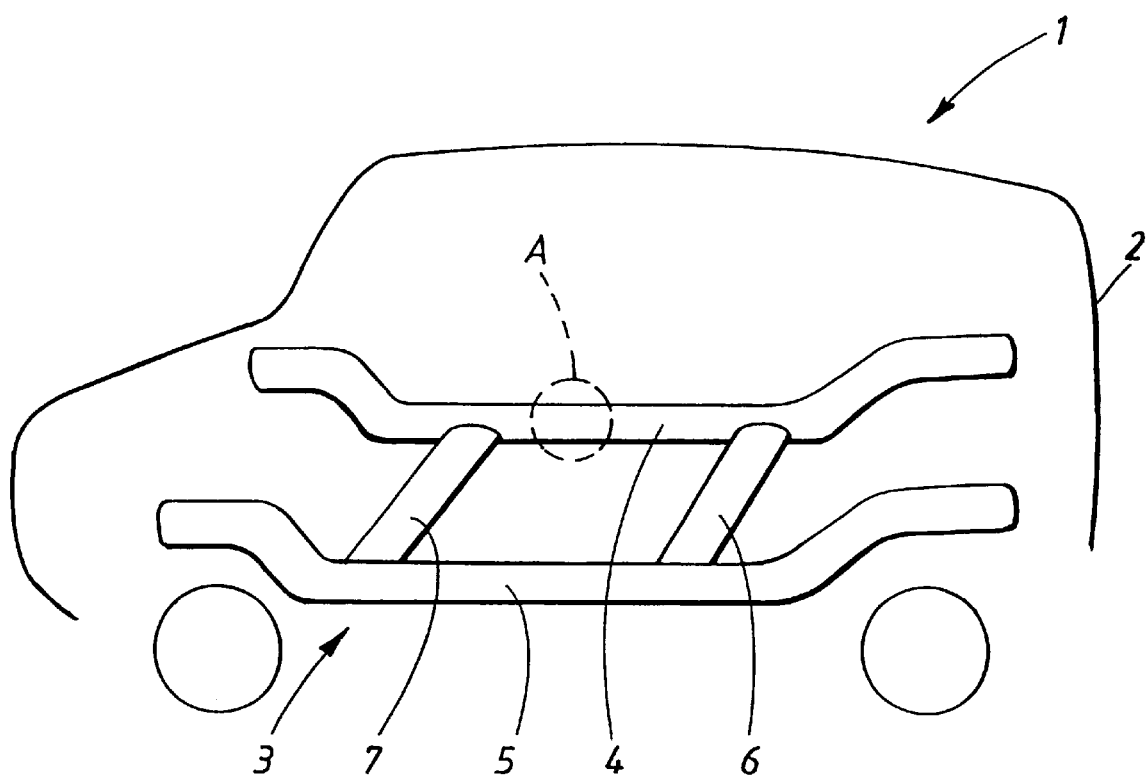
FIG. 1 shows in basic representation an arrangement according to the present invention, based on a first embodiment.

FIG. 1 shows, in schematic form, an arrangement according to the present invention. According to a preferred embodiment, the invention is arranged in a transport means, for instance in the form of a motor vehicle 1, and more particularly, in the form of a passenger car. The invention is not, however, limited to this type of transport means but can in principle be used in all types of engine-powered transport means, for example commercial vehicles, buses, airplanes boats and rockets.

The vehicle 1 may be conventionally constructed with an outer body 2 and a chassis structure 3, which together are configured to give the vehicle 1 its required stability, rigidity and energy-absorbing capabilities. The chassis structure 3 is, in turn, constructed from a number of closed, i.e. hollow, construction elements in the form of beams, which together form a system of beams involving two longitudinal side beams 4,5 connected by means of two transverse beams 6,7.

The illustration of FIG. 1 is greatly simplified and does not show all of the chassis and body components which are normally incorporated into such a vehicle 1. Various chassis structure arrangements, notably in the form of beam systems in typical transport vehicles, are known, but are not described in detail. Apart from the chassis structure 3, the vehicle 1 additionally includes, in known manner, a number of further construction elements, for example, doors, floor, roof panels, bonnet and boot. The vehicle 1 further comprises traditional vehicle components such as engine, wheel suspension, engine control system, etc. Such construction elements are, however, not shown because of familiarity within the art with these vehicle components.

The beams 4,5,6,7 of FIG. 1 can be configured in various ways. They are preferably produced by so-called hydroforming of aluminum. Hydroforming is a method which is known, per se, and in which water pressure is used in the forming of the respective beam. Aluminum is suitable for use since it is a material offering favorable properties with regard to weight, rigidity and deformation. Alternatively, magnesium can also be used for this purpose. The invention is not, however, limited to these two materials of construction, nor to being realized by hydroforming; rather, the beams 4,5,6,7 can be made from other materials and by other production methods. For example, the beams 4,5,6,7 can be made of steel or fibre-reinforced plastic.

An underlying principle of the invention is that the beams 4,5,6,7 are of closed configuration and that the closed space which is formed inside the respective beam 4,5,6,7 is used as storage space for a fuel supplying the engine of the vehicle 1. In this context, the engine fuel is preferably constituted of gaseous hydrogen, which is then used as fuel in a drive device for the vehicle 1. The drive device is expediently based upon hydrogen-gas-powered fuel cells which are known. It can thus be said that the beams 4,5,6,7, according to the invention, constitute a combined beam system and fuel-storage unit.

Figure 2:
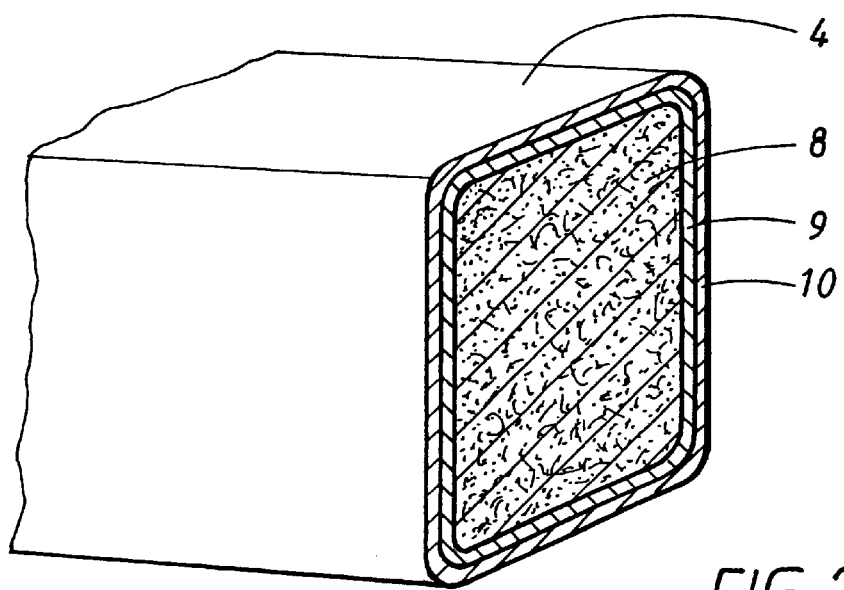
FIG. 2 shows an enlargement of a portion of a beam structure which is utilized according to the invention.

FIG. 2 shows a somewhat enlarged view of a portion of a side beam 4, according to the area marked with a dashed circle and having the reference notation A in FIG. 1. In principle, all beams 4,5,6,7 are of substantially corresponding configuration.

As can be seen from FIG. 2, the beam 4 is configured with an essentially rectangular cross section with somewhat rounded corners. The invention is not, however, limited to this configuration, but rather the beam 4 can, in principle, be configured differently, for example, with a circular cross section.

For effective storage of the fuel in question, the beam 4 is preferably configured with an inner structure 8 in the form of a nanostructure, preferably in the form of graphite nanofibers. Nanostructures of this kind for storing hydrogen are previously known, and by way of example, through U.S. Pat. No. 5,653,951. Such a nanostructure allows chemisorption (chemical adsorption) of hydrogen gas molecules; i.e., it is configured with a special crystal structure having lamella-like spaces which are dimensioned in such a way in relation to the size of the molecule that the chemisorption is admitted. In this way, a strong chemical bonding is obtained between the hydrogen molecules which are adsorbed and the surface in the nanostructure to which they are adsorbed. The construction of the nanostructure, moreover, allows the hydrogen molecules to be packed very tightly.

As can be seen from FIG. 2, the nanostructure 8 is preferably arranged so that it fills essentially the entire hollow space which is formed inside the closed beam 4.

As can be further appreciated from FIG. 2, the nanostructure 8 is surrounded by a further layer in the form of a barrier layer 9 provided to prevent hydrogen gas from leaking out of the beam 4; i.e., through its shell surface. It can be noted in this context that there is a need to ensure that the fuel storage unit which is formed by the beams 4,5,6,7 is totally leek-proof. The barrier layer 9 is preferably constituted by a suitable metal hydride compound through which the necessary sealing function is obtained. The barrier layer 9 is enclosed, in turn, by the casing 10 enclosing the beam 4.

A plurality of different metal hydride compounds can be used to produce the barrier layer 9. Bound hydrogen in the barrier layer 9 will thereby prevent free hydrogen molecules from forcing their way out through the outer wall of the beam 4.

Hydrogen can be stored in the chassis structure 3 under different temperatures and pressure. Preferably, a storage temperature is used which is of the order of magnitude of room temperature and a storage pressure which, if permanently maintained, is preferably of the order of magnitude of about 40 bars. From this it follows that the beams and connections to the drive system of the vehicle 1, that is the fuel-consumption unit or engine, must be configured and dimensioned to accommodate this pressure level.

The characteristics that have been described above in which a fuel-storage unit is formed by existing beams 4,5,6,7 in a chassis structure 3 can also be utilized for storing other gaseous fuels, for example, natural gas. In principle, the invention can be used for storing all types of gaseous or liquid fuels which are intended for engine-powered transport means. Expediently, however, gaseous fuels having a molecular size which is matched to the dimensions of the utilized nanostructure allow optimal storage efficiency in the nanostructure.

The basic principle behind the invention can also be used in such a way that components of a vehicle other than beams which form part of the chassis structure can be used for such fuel storage. For example, exterior and interior panel structures such as roof and floor panels, bonnet and boot lids, side panels and other body structures can be used for these described purposes, provided they are configured in such a way that they are closed; i.e., with an inner, hollow storage space.

Figure 3:
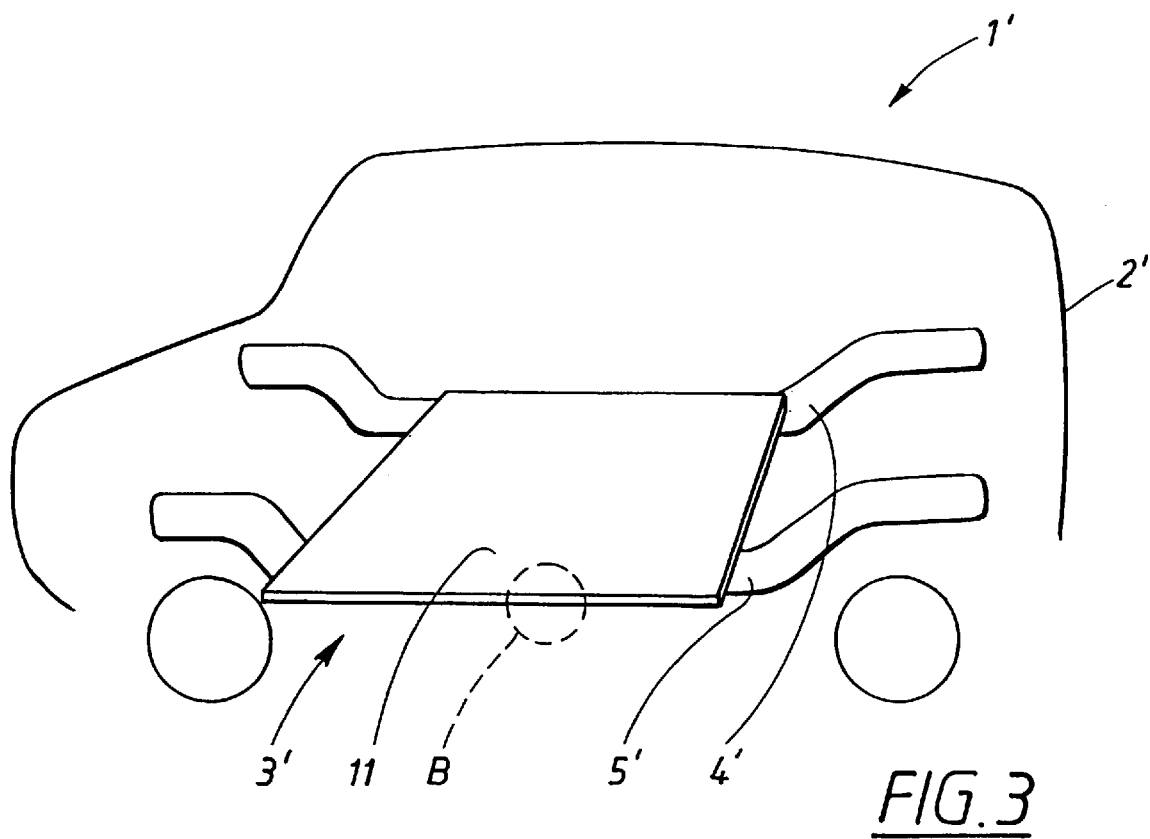
FIG. 3 shows in basic representation an arrangement according to the invention, based an a second embodiment.

FIG. 3 shows an embodiment with a vehicle 1', which is constructed in the same manner, in principle, as the vehicle shown in FIG. 1; i.e., having an outer body 2' and a chassis structure 3', which, in turn, is made up of a number of closed construction elements, more precisely including two longitudinal side beams 4',5'. Between these side beams 4',5', which can be connected by means of transverse beams or like structures (not shown), there is additionally arranged a structure in the form of a floor panel 11.

Figure 4:
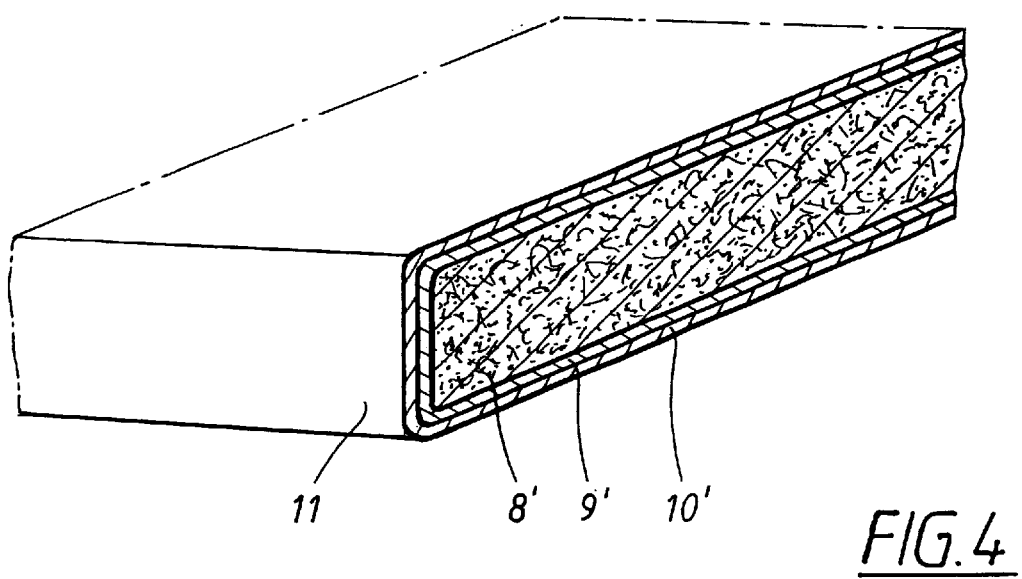
FIG. 4 shows an enlargement of a portion of a floor panel structure which is used according to the invention.

FIG. 4 shows a somewhat enlarged view of a portion of the floor panel 11, which portion is indicated by a dashed circle having the reference notation B in FIG. 3. As can be seen from FIG. 4, the floor panel 11 is constructed in a manner corresponding in principle to the beams described with reference to FIGS. 1 and 2; i.e., the floor panel 11 is configured as a closed structure having an inner space in which a nanostructure 8' is arranged. As described above, this inner space is used as storage ace for a fuel which is intended for the engine of the vehicle 1.

Analogous with what has been described with reference to FIGS. 1 and 2, the floor panel 11 shown in FIG. 4 is further provided with a barrier layer 9' disposed between the nanostructure 8' and a surrounding casing 10' belonging to the floor panel 11.

By using, for example, the beam structure of the vehicle 1 or a floor panel as an outer casing for a fuel-storage unit, very large quantities of hydrogen gas can be stored without any special, separate hydrogen tank requiring accommodation on the vehicle 1. This will, of course, produce a very economical storage of hydrogen. When the invention is used in a normal passenger car, there is normally a combined cubic capacity of the beam elements which can be used to store hydrogen of the order of magnitude of 50–70 liters. In a structure in which both a nanostructure 8 and a sealing layer 9 are used, a great range of travel for the vehicle, at least 20,000 km, may be obtained. In such cases, refilling of the hydrogen gas store can expediently be carried out during an ordinary vehicle service, which normally occurs at 15,000 or 20,000 km intervals.

When the invention is used for fuel storage in a vehicle of the passenger car type, it can be noted that there is, in principle, such a large accessible volume in the normally provided vehicle structure that by using the chassis structure, accessible panels, doors, floor, etc., the vehicle would potentially never have to be refilled with hydrogen gas during the entirety of its service life.

The invention is not limited to the above-described embodiments, but can be varied within the scope of the claims to follow. For example, the invention is not limited to be used for the storage of hydrogen gas, but can also be used for other gaseous fuels such as, for example, natural gas.

The invention can be used with different types of transport means, for example cars, boats, airplanes and space craft.

Furthermore, the above-described nanostructure can also, in principle, be excluded. However, this will not then allow the very high level of storage efficiency which is preferred. In principle, the above-mentioned barrier layer can also be excluded, which might be of interest in those cases where a complete sealing can be obtained in the fuel storage unit itself. When hydrogen is used as fuel, the barrier layer is preferably used, however, in order to avoid the risk of hydrogen diffusing through the outer casing of the structure in question.

What is claimed and sired to be secured by Letters Patent is allows:

1. A device for storing fuel in an engine-powered transport vehicle comprising:
    at least one closed construction element incorporated as an integral part of the transport vehicle, said integral part being selected from the group consisting of a body or chassis structure,
    said closed construction element being arranged as a storage unit for fuel,
    said construction element being configured so that an interior space of said construction element supports a nanostructure for storing fuel in the form of hydrogen gas adsorbed in said nanostructure;
    the construction element further comprising a shell surface; and
    a barrier layer comprising a metal hydride compound and supported on the shell surface, the barrier layer configured to prevent fuel from leaking through the construction element.

2. The device according to claim 1, wherein said integral part is said chassis structure, said chassis structure further comprising a beam element of said transport vehicle.

3. The device according to claim 1, wherein said integral part is said body structure, said body structure being selected from the group consisting of a panel, door, hatch or a floor structure of said transport vehicle.

4. An arrangement for storing fuel in an engine-powered transport vehicle comprising:

- a transport vehicle (1) having a chassis structure (3) including two longitudinal side beams (4,5), said side beams (4,5) being of closed hollow construction;
- each of said side beams (4,5) being configured as a fuel storage unit and having a shell surface (10) and an interior space configured to store fuel therein:
- said interior space containing a nanostructure (8), said nanostructure (8) being configured to absorb hydrogen therein for storing fuel within an interior space of said side beams (4,5);
- a barrier layer (9) supported on the shell surface (10), said barrier layer (9) configured to prevent hydrogen fuel from leaking out of said side beams (4,5); and
- said barrier layer (9) being composed of a metal hydride compound.

5. The arrangement of claim 4, further comprising:
said interior space containing a nanostructure (8).

6. The arrangement of claim 4, further comprising:
each of said side beams (4,5) having an essentially rectangular cross-sectional shape.

7. An arrangement for storing fuel in an engine-powered transport vehicle comprising:

- a transport vehicle having a door, said door being of closed hollow construction;
- said door being configured as a fuel storage unit and having a shell surface and an interior space configured to store fuel therein;
- said interior space containing a nanostructure, said nanostructure being configured to absorb hydrogen therein for storing fuel within said interior space of said door;
- a barrier layer supported on the shell surface, said barrier layer configured to prevent hydrogen fuel from leaking out of said door; and
- said barrier layer being composed of a metal hydride compound.

* * * * *

UNITED STATES PATENT AND TRADEMARK OFFICE
CERTIFICATE OF CORRECTION

PATENT NO. : 6,676,159 B1
DATED : January 13, 2004
INVENTOR(S) : Sellergren

It is certified that error appears in the above-identified patent and that said Letters Patent is hereby corrected as shown below:

<u>Title page,</u>
Item [73], add as follows:
-- [73]   Assignee:   Volvo Personvagnar AB, Göteborg (SE) --

Signed and Sealed this

Twenty-third Day of March, 2004

JON W. DUDAS
*Acting Director of the United States Patent and Trademark Office*